US010648734B2

(12) United States Patent
Shortt et al.

(10) Patent No.: US 10,648,734 B2
(45) Date of Patent: May 12, 2020

(54) CENTRIFUGAL PELLET DRYER

(71) Applicant: GALA INDUSTRIES, INC., Eagle Rock, VA (US)

(72) Inventors: Louis Cody Shortt, Vinton, VA (US); Richard Borland Thrasher, Jr., Troutville, VA (US); Kerry Patrick Morris, Troutville, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 473 days.

(21) Appl. No.: 15/293,990

(22) Filed: Oct. 14, 2016

(65) Prior Publication Data

US 2018/0106539 A1 Apr. 19, 2018

(51) Int. Cl.

| | |
|---|---|
| ***F16D 1/12*** | (2006.01) |
| ***F26B 17/22*** | (2006.01) |
| ***F26B 5/08*** | (2006.01) |
| ***F26B 17/24*** | (2006.01) |
| ***F26B 3/06*** | (2006.01) |
| ***F26B 11/16*** | (2006.01) |

(52) U.S. Cl.

CPC ................ *F26B 17/22* (2013.01); *F26B 3/06* (2013.01); *F26B 5/08* (2013.01); *F26B 11/16* (2013.01); *F26B 17/24* (2013.01)

(58) Field of Classification Search

CPC ........ F26B 3/04; F26B 17/101; F26B 17/122; F26B 17/124; F26B 17/14; F26B 17/1425; F26B 17/1483

USPC ........... 34/397, 401; 403/120, 121, 123, 124

See application file for complete search history.

(56) References Cited

U.S. PATENT DOCUMENTS

| | | | | |
|---|---|---|---|---|
| 1,772,414 | A * | 8/1930 | Leveson | F16F 1/371 267/141.1 |
| 3,458,945 | A | 8/1969 | Edwards | |
| 3,794,166 | A | 2/1974 | Converse | |
| 4,565,015 | A | 1/1986 | Hundley, III | |
| 4,896,435 | A | 1/1990 | Spangler, Jr. | |
| 5,245,345 | A | 9/1993 | Bonta et al. | |
| 5,254,472 | A * | 10/1993 | Brooks, III | C05F 17/02 422/209 |
| 5,489,180 | A * | 2/1996 | Ichihara | B32B 7/02 411/544 |
| 6,138,375 | A * | 10/2000 | Humphries, II | F26B 5/08 34/147 |
| 6,438,866 | B1 | 8/2002 | Meydell et al. | |
| 6,467,188 | B1 | 10/2002 | Sandford | |
| 6,505,416 | B2 | 1/2003 | Sandford | |
| 8,365,430 | B2 | 2/2013 | Veltel et al. | |

(Continued)

FOREIGN PATENT DOCUMENTS

| | | |
|---|---|---|
| DE | 4330078 | 3/1994 |
| GB | 2209486 | 5/1989 |

*Primary Examiner* — John P McCormack

(74) *Attorney, Agent, or Firm* — Jacobson Holman, PLLC.

(57) ABSTRACT

The present invention relates to a centrifugal pellet dryer comprising a housing accommodating a rotor surrounded by a screen, wherein said screen includes at least one porous screen member and is supported by a screen support holding the screen relative to the housing. To avoid vibrations and noise, the centrifugal pellet dryer has the screen supported against the housing by a screen support which includes at least one damper for dampening vibrations of the screen and/or isolating screen vibrations from the housing.

13 Claims, 4 Drawing Sheets

(56) References Cited

U.S. PATENT DOCUMENTS

Figure 1:
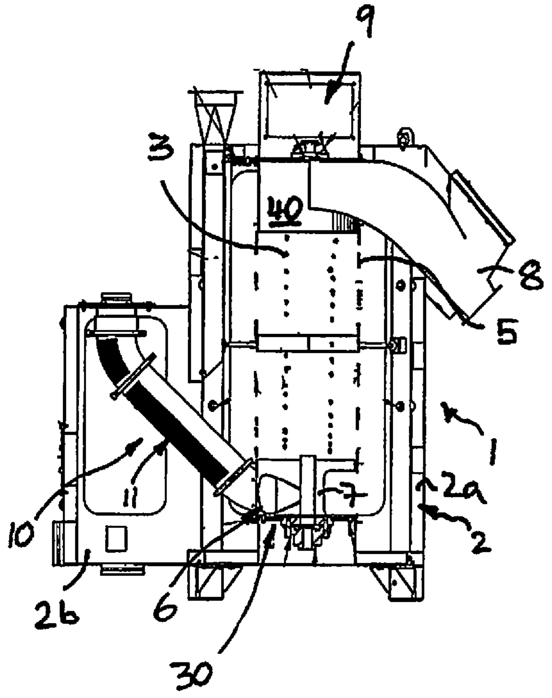

| | | | | |
|---|---|---|---|---|
| 2004/0244121 | A1* | 12/2004 | Lim | D06F 23/06 8/159 |
| 2006/0075791 | A1* | 4/2006 | Seo | D06F 37/22 68/23.1 |
| 2008/0072447 | A1* | 3/2008 | Hehenberger | B29B 9/16 34/318 |
| 2010/0037477 | A1* | 2/2010 | Veltel | F26B 5/08 34/58 |
| 2014/0154966 | A1* | 6/2014 | Joynt | A47K 10/48 454/338 |

* cited by examiner

CENTRIFUGAL PELLET DRYER

The present invention relates to a centrifugal pellet dryer comprising a housing accommodating a rotor surrounded by a screen, wherein said screen includes at least one porous screen member and is supported by a screen support holding the screen relative to the housing.

Centrifugal pellet dryers of the aforementioned type may be used, for example, for drying plastic pellets which may be produced, e.g., by an underwater pelletizer where molten plastic is fed through a die plate and cut into pellets by means of a cutter head on the downstream side of said die plate underwater. The cut pellets are conveyed away from the cutting chamber by means of water flowing through a piping system. The water-pellet-slurry may be fed into such centrifugal pellet dryer to separate the water from the pellets. In the alternative to such underwater pelletizing process, other processes may produce water-pellet-slurries that can be fed to such centrifugal pellet dryers to dry the pellets or pellet-like particles or substances and separate them from water or other liquids.

In such centrifugal pellet dryers, a rotor rotating about an upright axis of rotation may include conveying or lifting arms or elements causing the pellets to ricochet between the lifting elements and the screen surrounding the rotor while being conveyed by centrifugal action up the drying rotor in a helical path. The water may be separated through the screen which may have a perforation and/or may form a sieve screen, and the pellets may be continuously conveyed into the upper section of the dryer where the pellets may be discharged via an outlet opening formed in the housing in which the rotor surrounded by the screen is accommodated.

The separated water may be collected in a bottom section of the housing to be discharged therefrom via a water outlet. To further remove residual surface moisture from the pellets, a dry countercurrent airflow may be generated by an external exhaust fan to flow through a pellet outlet chute of the housing and/or at least an upper portion of the rotor space surrounded by the screen in a direction countercurrent to the pellets. Additionally, a pre-dewatering system may form a part of the feeding system for feeding the water-pellet-slurry to a loading area of the rotor. Such pre-dewatering system may be used to adjust the ratio of the amount of water to the amount of pellet-like substances before feeding the slurry onto the rotor and/or may provide for a rough separation of water without the action of the rotor, wherein in such pre-dewatering systems large amounts of water up to 95% of the process water may be separated from the pellet-like substances.

When the pellets or pellet-like substances are conveyed up the rotor, the pellets hit the screen due to the centrifugal forces what may cause vibrations of the screen. Such vibrations of the screen also may be influenced by the water draining through the at least one porous screen member, and additionally by the countercurrent dryer airflow flowing along and through the porous screen member. Due to the height of the screen and the limited rigidity of the porous screen member, screen vibrations and oscillations may be transmitted onto the housing, thereby creating undesired noise to the ambience of the housing. To reduce noise emissions to the ambience, it has already been suggested to provide the housing with a noise-dampening material such as a plastic foam filling the space between interior and exterior walls of a double-walled housing, thus forming a sandwich structure for the housing. However, such additional noise dampening material covering or filling the housing results in a bulky housing design and is space-consuming.

Furthermore, the screen may touch the rotating lifting members of the rotor if there is no sufficient gap between the lifting members and the inner surface of the screen, wherein such gap cannot be very large to avoid impact on the conveying efficiency.

In this regard, it is worth to be mentioned that such screens are often made from thin, flexible sheets of porous material. More particularly, flexible, bendable, board-like or plate-like screen members can be placed around screen carrier hoops in an arcuate or drum-jacket-like manner. The screen members have at their axially extending ends, which are adjacent in the position placed around the screen carrier hoops in the manner of a hoop, corresponding holding pieces, for example in the form of angle pieces or holding flanges, which are usually welded firmly to the usually metallic screen members or are optionally also clamped tight and then fixed for the purpose of the fastening of the screen members to one another. For example, U.S. Pat. Nos. 6,467,188, 6,505,416 or 6,438,866 show such cylindrical screens of centrifugal dryers in which screen members which are planar per se are first rolled up cylindrically and holding pieces are welded tight to the rims of the screen members which are then drawn together by screw-like clamping members. A centrifugal dryer for pellets is furthermore known from DE 43 30 078 A1 in which the screen is made up of two half-cylindrical shells. Furthermore, said screen sheet members may be clamped onto the ring-shaped carrier hoops by means of tensioning belts, cf. U.S. Pat. No. 8,365,430.

It is therefore an objective of the present invention to provide for an improved centrifugal pellet dryer avoiding at least one of the drawbacks of the prior art. More particularly, it is an objective underlying the invention to provide for an improved centrifugal pellet dryer reducing noise emissions without a bulky and heavy design of the housing.

A further objective underlying the present invention is to allow for a small gap between the lifting elements of the rotor and the screen without posing the risk of contacting the rotating lifting elements by the interior surface of the screen.

To achieve at least one of the aforementioned objectives, the present invention provides for a centrifugal pellet dryer having the screen supported against the housing by a screen support which includes at least one damper for damping vibrations of the screen and/or isolating screen vibrations from the housing. Such damper associated with the screen support prevents the screen from significantly vibrating and strongly oscillating and dissipates kinetic energy of the screen. Such damper significantly reduces the screen's tendency to vibrations and isolates the housing against vibrations of the screen.

More particularly, the screen support may include at least one support arm extending substantially radially from the screen to the housing, wherein said support arm may include the aforementioned damper.

Figure 2:
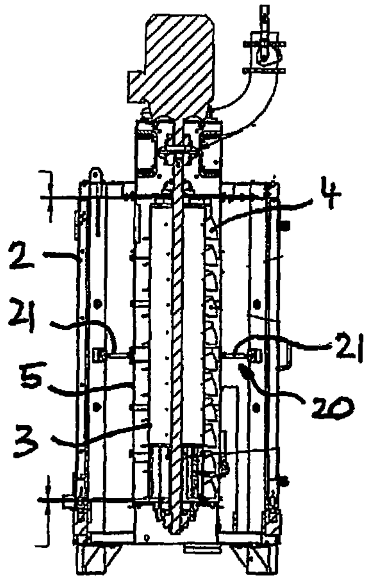
Figure 3:
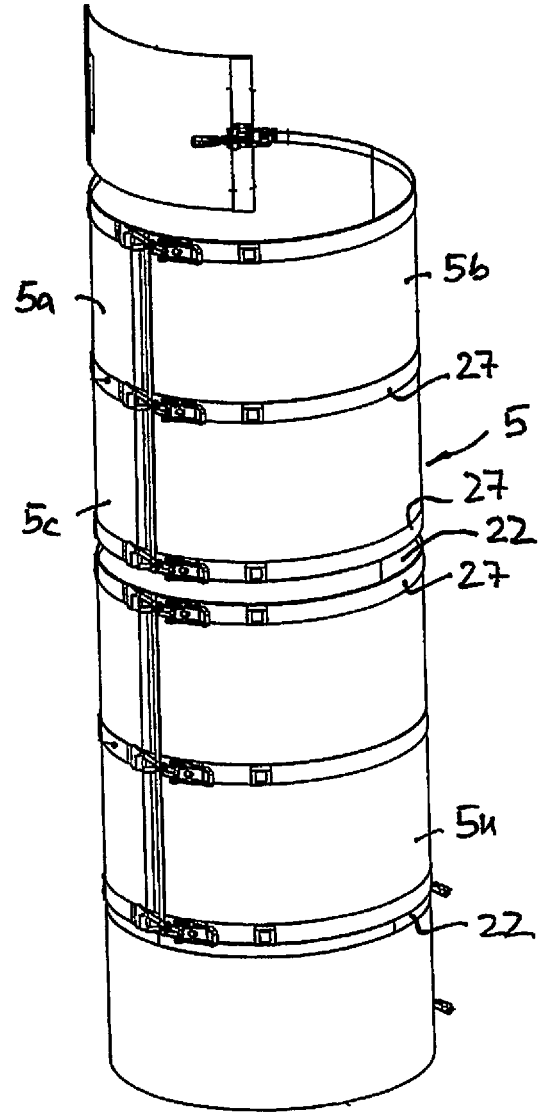
Figure 4:
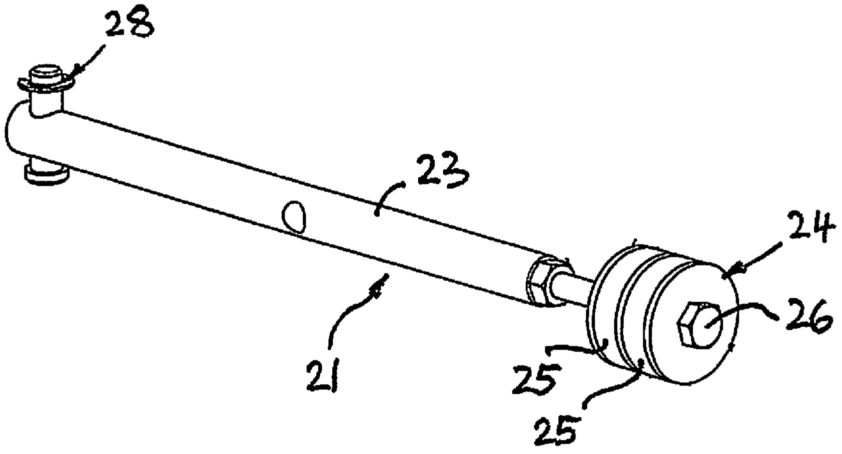

These and other features become more apparent from the following description and figures showing an advantageous embodiment of the invention. In the drawing show:

FIG. 1: a schematic, partly cross-sectional view of a centrifugal pellet dryer showing the inside of the housing and components arranged therein such as the feed piping, wherein the rotor and the screen is omitted to better illustrate the other components, FIG. 2: a cross-sectional view of the centrifugal dryer of FIG. 1 taken along the axis of rotation of the rotor, wherein the rotor including the lifting elements thereof and the screen surrounding said rotor and further support arms supporting the screen against the housing are shown, FIG. 3: a perspective view of the screen of the dryer of FIGS. 1 and 2, wherein screen members fastened to screen carrier hoops by tensioning belts are shown, and FIG. 4: a perspective view of a support arm for supporting the screen against the housing, wherein a rubber-like dampening element forming a portion of said support arm is shown.

To reduce noise emissions without a bulky and heavy design of the housing and to allow for a small gap between the lifting elements of the rotor and the screen without posing the risk of contacting the rotating lifting elements by the interior surface of the screen, a centrifugal pellet dryer is suggested to have the screen supported against the housing by a screen support which includes at least one damper for damping vibrations of the screen and/or isolating screen vibrations from the housing. Such damper associated with the screen support prevents the screen from significantly vibrating and strongly oscillating and dissipates kinetic energy of the screen. Such damper significantly reduces the screen's tendency to vibrations and isolates the housing against vibrations of the screen.

More particularly, the screen support may include at least one support arm extending substantially radially from the screen to the housing, wherein said support arm may include the aforementioned damper. Such support arm may prevent the screen from movements and/or deformations transverse to the longitudinal axis of the screen and/or transverse to the axis of rotation of the rotor, thus preventing the screen from vibrations and from contact to the lifting elements of the rotor.

Said damper may include at least one rubber-like elastic damping member forming a portion of said support arm.

The support arm may be adjustable in length and/or have a telescopic configuration, wherein said at least one damper is configured to damp length-adjusting movements of said support arm. The damper may include the aforementioned rubber-like elastic damping member. In addition or in the alternative, damping of the length-adjusting movements may be achieved in other ways, e.g. by means of a viscous liquid caused to flow through flow restriction means when two arm members move relative to each other to achieve such length adjusting.

Advantageously, the aforementioned. rubber-like elastic damping member may form a bearing part and/or connector part allowing to connect the support arm to the housing or to the screen. More particularly, the rubber-like damper element may form a damper block that can be received in a recess formed in the interior wall of the housing, thus achieving a double function: The damper element may allow for longitudinal adjusting of the support arm and, at the same time, may achieve a damped fixation of the support arm.

Said at least one support arm may be arranged to connect a middle section of the screen arranged between top and bottom sections thereof to the housing.

A plurality of support arms may be arranged in a common plane and/or in a star-like distribution around the screen.

One or more support arms holding or supporting a middle section of the screen is particularly effective, as it is usually the middle section that tends to vibrations and bending/transverse movements.

To avoid resonance effects and to prevent the screen from natural oscillation, said star-like distribution of the support arms may be asymmetrical and/or an odd number of support arms may be used. For example, when there are four support arms, the angular spacing may not be 90° between each pair of neighboring support arms, but there may be 80° between the first and second support arms, 100° between the second and third support arms, 110° between the third and fourth support arms and finally 70° between the fourth and first support arms. According to another example having three support arms, there may be 100° between the first and second support arms, 120° between the second and third support arms and finally 140° between the third and first support arms.

In addition or in the alternative, the support arms may be configured to have different damping characteristics, wherein, for example, the support arms may have damping members which may have elastic moduli different from each other and/or rigidities different from each other and/or dimensions such as length and/or diameter different from each other and/or may be made of different materials.

At least one porous screen member can be mounted onto a screen frame member which is supported by the screen support against the housing.

More particularly, said screen frame member may includes a screen carrier hoop onto which said porous screen member can be clamped by at least one tension belt, wherein also said screen support may be held onto said screen carrier hoop by said tension belt. More particularly, a pivot bearing piece can be held to said screen carrier hoop by such tensioning belt or in other ways such as by screws, wherein said support arm may be connected to such pivot bearing piece.

As can be seen from FIG. 1, the centrifugal pellet dryer 1 may include a housing 2 that may have a tower-like central portion **2*a* in which a rotor 3 is accommodated. Said rotor 3 may have an upright, substantially vertical axis of rotation and may include a plurality of lifting elements 4 extending at least in part spaced apart from said axis of rotation, wherein such lifting elements 4 may be configured to have inclined lifting surfaces functioning as paddles or shovels conveying the pellets up the rotor 3**.

Said rotor 3 may be surrounded by a screen 5 which may have a cylindrical shape surrounding the rotor 3, wherein said screen 5 may comprise several screen sections or screen elements. Said screen 5, at least in part, may have a sieve-like or net-like configuration with a plurality of perforations allowing water to be drained through said screen.

As can be seen from FIG. 1, the rotor 3, at a lower section or bottom section, may have its loading area where water-pellet-slurry is fed onto the rotor 3, wherein said loading area 6 may be formed by a base portion of the rotor unit surrounding the rotatable rotor 3 and the lifting elements 4 thereof. As can be seen from FIG. 2, said base portion 7 may include a ring element or sleeve element to which the screen 5 can be connected.

At an upper portion, the housing 2 may include a pellet outlet 8 which may form a chute for discharging dried pellets, wherein such pellet outlet 8 may be connected to an outlet opening in the uppermost screen portion to substantially radially discharge the pellets from the rotor 3.

As shown by FIG. 1, an airflow generator 9 may be provided on top of the housing 2 so as to generate a dry airflow helping to remove residual moisture from the pellets, wherein such dry airflow may be generated to be counter-current airflow flowing into the housing 2 through the pellet outlet 8 and/or to flow in the housing downwards along the rotor 3, more particularly in the interior space between the screen 5 and the rotor 3.

As shown by FIG. 1, the housing 2 may include a side portion **2*b* accommodating a feeding system 10 for feeding water-pellet-slurry to the loading area 6 of the rotor 3. More particularly, said feeding system 10 may include a feed piping 11**.

As can be seen from FIG. 3, the screen 5 may be composed of a plurality of screen members 5*a*, 5*b* . . . 5*n* which may be each made up of elastic, porous screen boards or plates which are planar or slightly pre-arched, in particular pre-rolled or suitably curved in a different manner in a starting state and which have been brought into the arcuate or substantially cylindrical shape shown in the Figures.

More particularly, as shown by FIG. 3, the screen members 5*a*, 5*b* . . . 5*n* may each form cylinder jacket surface sections since the screen 5 is composed, viewed in the peripheral direction, of a plurality of screen members 5*a*, 5*b* . . . 5*n* which mutually overlap and together form a screen ring. In this respect, the screen 5 is not only composed of a plurality of screen members 10 when viewed in the peripheral direction, but also when viewed in the axial direction. In this respect, FIG. 3 shows five screen sections which are separate in the axial direction and which are each formed from a plurality of screen members 5*a*, 5*b* . . . 5*n*.

The screen members 5*a*, 5*b* . . . 5*n* are each wound around ring-shaped screen carrier hoops 22 at their end-face end sections, with a common screen carrier hoop 22 being provided between each two screen sections.

The screen sections may be made substantially cylindrical, i.e. the screen members surround the jacket surface of the respective screen section, with the plurality of screen members 5*a*, 5*b* . . . 5*n* mutually overlapping at their axial rims.

The screen members 5*a*, 5*b* . . . 5*b* may be held together and fastened by tension belts or tension bands 27 which can be formed by differently made tension members, for example in the form of ropes, belts or hoops. In accordance with a preferred embodiment of the invention, the tension belts 27 could preferably be made of resiliently flexible, tension-resistant, flat bands, preferably made of metal. The tension belts 27 can be laid around the screen members so that they wrap around the latter in the region of the screen carrier hoops 22 so that the screen members 10 can be clamped onto the screen carrier hoops 22 by clamping the tension belts 27. For this purpose, fast clamping means in the form of clamping levers may be provided at the tension belts 27 which can be actuated without tools and which are fastened to an end of the tension belts 27.

With its upper and lower end portions, the screen 5 can be connected to inlet and outlet members 30 and 40 which are attached to bottom and top portions of the housing 2, wherein said inlet member 30 may be formed by the afore-mentioned base member 7 and may allow for feeding the water-pellet-slurry onto the rotor 3, whereas the outlet member 40 may allow for discharging the pellets from the rotor through the aforementioned outlet 8 of housing 2.

Said inlet and outlet members 30 and 40 may form substantially ring-shaped members onto which the substantially cylindrical end portions of the screen 5 can be connected, wherein the screen may have a certain overlap with such ring members.

As can be seen from FIG. 2, the screen is additionally supported against the housing 2 by means of a screen support 20 which may include a plurality of support arms 21 which may be arranged in a star-like distribution between the screen 5 and the housing 2. More particularly, at least two of such support arms 21 may be arranged in a common plane, wherein three or four or more than four of such arms 21 may be provided so as to give the screen 5 support in different radial directions. Radial directions mean directions transverse to the axis of rotation of the rotor 3 and/or transverse to the longitudinal axis of the screen 5.

More particularly, said support arms 21 may be arranged in an asymmetric manner and/or positioned at different angular spacings from each other. For example, when there are only two support arms, such support arms may be arranged to have a 170° angle and a 190° angle between them. When there are three support arms 21, such support arms may be arranged at, e.g., 12 o'clock, 3 o'clock and 8 o'clock, for example. Such asymmetric arrangement and/or an odd number of support arms may help in reducing the danger of oscillation at a resonance frequency.

In addition or in the alternative, the support arms 21 may be configured to have dampening characteristics different from each other. For example, they may be configured to have stiffnesses different from each other and/or elastic moduli different from each other and/or rigidities different from each other and/or made from materials different from each other. Giving the support arms different dampening characteristics may help in preventing the screen from natural oscillation.

As can be seen from FIG. 2, said support arms 21 may extend from an outer side of the screen to an inner side of the housing and/or may connect the screen to the housing, wherein said support arms 21 may support a middle section of the tower-like screen 5 between the top and bottom section thereof.

More particularly, said support arms 21 may connect one of the screen carrier hoops 22 associated with a middle section of the screen to the housing.

As can be seen from FIG. 4, said support arms 21 may include a strut-like arm member 23 to which a damper 24 is attached. Such damper may include at least one damping member 25 made of a rubber-like elastic material damping vibrations and dissipatinq kinetic energy. As can be seen from FIG. 4, a plurality of disk-like rubber members may be provided and separated from each other by means of washer plates, wherein the package of the damping members 25 can be attached to one end of the arm member 23 by means of, e.g., a screw bolt 26 which is in screwing engagement with the arm member 23 so as to allow for adjustment of length of the support arm 21.

On the other end opposite to the damper 24, the support arm 21 may be provided with a bearing such as a pivot bearing 28.

As can be seen from FIG. 2, the support arms 21 may be attached to the screen carrier hoop 22 via the aforementioned pivot bearing 28 so that each of the support arms 21 can pivot relative to the screen 5.

On the other hand, the support arms 21 may be supported against the inside surface of the housing 2 by means of the aforementioned dampers 24, wherein such dampers 24 may be connected to damping receivers provided on the interior surface of the housing 2, cf. FIG. 2.

To avoid resonance effects, the damping members 25 of different support arms 21 may be made from different materials and/or may have different dimensions to give the support arms 21 different damping characteristics. For example, a first support arm 21 may have a package of two damping members 25, whereas a second support arm 21 may have a package of three damping members 25.

In addition or in the alternative, it is also possible to have the support arms 21 mounted in different orientations. For example, a first support arm 21 may be mounted with its damper 24 at the screen 3, whereas a second support arm 21 may be mounted with its damper 24 at the housing 2.

The invention claimed is:

1. A centrifugal pellet dryer, comprising a housing accommodating a rotor which is surrounded by a screen, said screen including at least one porous screen member having top and bottom sections and being supported by a screen support, said screen support holding the screen relative to the housing and said screen support including at least one damper connecting a middle section of the screen, arranged between said top and bottle sections, to the housing for damping vibrations of the screen and/or isolating screen vibrations from the housing.

2. The centrifugal pellet dryer according to claim 1, wherein said screen support includes at least one support arm extending substantially radially from said middle section of the screen to the housing, said support arm including said damper.

3. The centrifugal pellet dryer according to claim 2, wherein said damper includes at least one elastic damping member forming a portion of said support arm.

4. The centrifugal pellet dryer according to claim 2, wherein said support arm is adjustable in length and/or has a telescopic configuration, wherein said damper is configured to damp length-adjusting movements of said support arm.

5. The centrifugal pellet dryer according to claim 1, wherein a plurality of support arms are arranged in a common plane around the screen.

6. The centrifugal pellet dryer according to claim 5, wherein an odd number of support arms is provided and/or said support arms are arranged in an asymmetric distribution around the screen with angular spacings between neighboring pairs of support arms being different from each other.

7. The centrifugal pellet dryer according to claim 5, wherein said plurality of support arms are configured to have damping characteristics different from each other.

8. The centrifugal pellet dryer according to claim 1, wherein said at least one porous screen member is mounted onto a screen frame member which is supported by the screen support against the housing.

9. The centrifugal pellet dryer according to claim 8, wherein said screen frame member includes a screen carrier hoop onto which said porous screen member is clamped by at least one tension belt, wherein said screen support is held onto said screen carrier hoop by said tension belt or pivotably supported by a pivot bearing piece attached to said screen carrier hoop.

10. The centrifugal pallet dryer according to claim 9, wherein said damper forms an elastic bearing piece configured to be connected to the housing and/or to be received in a recess in an interior wall of the housing.

11. The centrifugal pellet dryer according to claim 1, wherein said damper includes a package of elastic damping elements separated from each other by washer plates and connected to each other by means of a connection element.

12. The centrifugal pellet dryer according to claim 8, wherein said screen is made up of at least two screen members, said at least two screen members being wrapped around ring-shaped screen carrier hoops at their end-face end sections with a common screen carrier hoop being provided between adjacent screen members, said at least one damper connecting said common screen carrier hoop to said housing.

13. The centrifugal pellet dryer according to claim 1, wherein said damper extends in a substantially horizontal plane transverse to an axis of rotation of said rotor.

* * * * *